United States Patent [19]

Lilja et al.

[11] Patent Number: 5,505,434

[45] Date of Patent: Apr. 9, 1996

[54] METHOD AND APPARATUS FOR IMPROVING HEAT AND DUST RECOVERY IN A WASTE HEAT BOILER

[75] Inventors: Launo L. Lilja; Valto J. Mäkitalo, both of Pori, Finland

[73] Assignee: Outokumpu Engineering Contractors Oy, Espoo, Finland

[21] Appl. No.: 366,990

[22] Filed: Dec. 30, 1994

[30] Foreign Application Priority Data

Dec. 31, 1993 [FI] Finland .................................... 935951

[51] Int. Cl.⁶ .................................................. C21B 7/22
[52] U.S. Cl. ............................................ 266/44; 266/155
[58] Field of Search ............................ 266/95, 44, 155, 266/144, 148; 98/58

[56] References Cited

U.S. PATENT DOCUMENTS 2,182,129  12/1939  Kuzell ..................................... 266/155
3,601,382   8/1971  Sandri et al. ............................ 266/155
4,475,947  10/1984  Andersson ............................... 266/155
4,908,058   3/1990  Saarinen ................................. 266/155

*Primary Examiner*—Scott Kastler
*Attorney, Agent, or Firm*—Brooks Haidt Haffner & Delahunty

[57] ABSTRACT

The invention relates to a boiler construction successive to a smelting furnace, particularly a flash smelting furnace, whereby a direct flow from the radiation section of a waste heat boiler to the convection section thereof is prevented by means of an intermediate plate located in the boiler, advantageously made of cooler pipes and arranged in a direction essentially parallel to the flow. At the same time, the return of the gas flow to the outlet opening of the smelting furnace is prevented in order to reduce the tendency to dust accretions caused by the gases. By means of a flow pattern thus optimized, the eddy currents or dead areas in the radiation section are remarkably reduced, which lengthens the delay time advantageous mainly for heat transfer.

13 Claims, 3 Drawing Sheets

METHOD AND APPARATUS FOR IMPROVING HEAT AND DUST RECOVERY IN A WASTE HEAT BOILER

The invention relates to a boiler construction successive to a smelting furnace, particularly a flash smelting furnace, whereby a direct flow from the radiation section of the waste heat boiler to the convection section thereof is prevented by means of an intermediate plate located in the boiler, advantageously made of cooler pipes and arranged in a direction essentially parallel to the flow. At the same time, the return of the gas flow to the outlet opening of the smelting furnace is prevented in order to reduce the tendency to dust accretions caused by the gases. By means of a flow pattern thus optimized, the eddy currents or dead areas in the radiation section are remarkably reduced, which lengthens the delay time advantageous mainly for heat transfer.

BACKGROUND OF THE INVENTION

1. Field of the Invention

A waste heat boiler successive to a suspension smelting furnace usually is a horizontal boiler consisting of two parts, the radiation section and the convection section. The purpose of the radiation section is to cool the gases, so that the molten particles contained therein are solidified, and the temperature sinks down below the sintering temperature of the particles prior to conducting the gases to the convection section of the boiler. This prevents their sintering in the convection section, in the cooling pipework whereby the final heat of the gases is recovered.

The temperature of the gases coming from suspension smelting is in the range of 1,300° C., and their dust content is fairly high. This brings forth difficulties already in the radiation section. After reacting unfavourably with oxygen, the dust sticks onto the surface of the steam pipes provided in the wall, and consequently, owing to the formed insulating layer, weakens heat transfer from the gas to the pressurized vapor flowing in the pipes. In the worst case, the formed dust layer may grow so thick that it comes off and causes danger when falling down. If the heat transfer in the radiation section weakens, the gases flow too hot into the pipework of the convection section, causing even worse blocking problems there. Blocking may also take place in the aperture in between the uptake shaft of the flash smelting furnace and the boiler, which in known fashion leads to changes in the circulations and pressures, and to successive interruptions in the production.

2. Description of the Prior Art

In the prior art there is known a rapping system for removing dust accretions in a waste heat boiler. Rapping is known to have had a positive effect, but only in eliminating the symptoms, not the cause of the disturbance. When this method is applied too vigorously, the drawbacks are soon apparent in the reduction of the service life of the boiler equipment. There is also known a method for feeding oxygen-bearing gas into the radiation section in order to bring about advantageous reactions.

Another prior art method is the use of separate cooling panels arranged in the radiation section parallel to the boiler flows in order to improve heat recovery; now the flow is free to proceed on both sides of the panel. In similar fashion, in the radiation section there has been used an intermediate cooling wall transversal to the direction of the flow, by means of which wall the main flow is made to proceed from underneath the wall and thus lengthen effective delay time; the area of cooling surface is naturally expanded. Experiences from transversal walls are, however, bad, because they easily tend to accumulate dust accretions.

In some cases the convection section is located on a level lower than the radiation section in order to change the gas flow pattern. The purpose is to prevent the gas from flowing directly along the ceiling of the radiation section of the waste heat boiler, so that the convection section is placed lower down than the radiation section, in which case the rear part of the ceiling in the radiation section is downwardly inclined. The U.S. Pat No. 4,530,311 introduces a method for descending the radiation section in a stepwise fashion and for thus preventing a direct flow into the convection section. At the same time, the radiation section is provided with cooling panels parallel to the flow, in order to increase the heat transfer surface. These work well, if they are correctly designed.

However, dust accretions accumulate in horizontal tunnel-type waste heat boiler constructions owing to the high dust-content of the gases formed in suspension smelting; these accretions are an obstruction for an effective operation of the waste heat boiler, as well as for the whole suspension smelting process. These operation difficulties may cause production breaks in suspension smelting processes and thus result in great economical losses for the producer.

The tendency to dust accretions is enhanced for instance by the following factors:
In the radiation section of the waste heat boiler, only the roof and top parts of the walls are in effective use—presupposing that they are clean. Because a major part of the heat load is focused on a small area of the boiler, it is difficult to keep the waste heat boiler clean. Moreover, the hot dust-bearing gases flow partly uncooled directly into the convection section of the waste heat boiler, which causes the molten dust particles to stick onto the cooling pipework, and the cooled particles to sinter.
The formation of dust accretions is also enhanced when an increased number of dust particles collides with the boiler walls. The collision probability is higher for all walls that are located transversally to the flow. In addition to this, the bottom part of the waste heat boiler is a poor receiver of radiation, but allows a harmfully long delay time (causing eddy currents) for part of the dust-bearing gases and forms good conditions for the formation of harmful sulfur trioxide. The formation of $SO_3$ may, because of the humidity contained in the gases, and/or because of possible boiler leaks, form sulfuric acid, which corrodes the constructions of the equipment. It is also pointed out that the dust accretion difficulties in a waste heat boiler increase as the boiler size grows.

In these prior art cases, the aim has been the removal of dust accretions (rapping devices), the prevention thereof (additional air supply), an extended delay time (transversal panel walls, stepwise descended radiation section, lowered convection section) or an expanded heat transfer surface (panel walls). However, in all these methods, the aperture in between the furnace and the boiler remains a favourable ground for dust accretions.

The purpose of the waste heat boiler construction of the present invention is to eliminate the drawbacks of the above described prior art constructions and to achieve a waste heat boiler that is more effective and more secure in operation, the said boiler being suited to cooling dust-bearing gases formed in the suspension smelting process and at the same time to dust recovery. Moreover, the structure according to the present invention is extremely well suited to raising the capacity of old boilers. The invention also relates to a corresponding method for forming a bulk-like flow and to lengthen the delay time of the whole flow in the radiation section of the boiler.

According to the invention, the radiation section is divided into two flow parts by means of a vertical intermediate plate, i.e. panel wall, suspended downwardly from the ceiling and made of steam pipes, or by means of a wall construction composed of several mainly successive panel walls. The wall or wall construction is arranged essentially in the lengthwise direction of the radiation section, but so that the gas inlet and outlet openings are provided on different sides of the wall. Underneath, the wall is open for the flow. The panel wall structure of the invention forms a space for the inlet flow from the radiation section, and the transversal flow area of this space is gradually reduced in the first part, i.e. in the inlet part, and respectively expanded in the second part, i.e. the outlet part. In the rear end the main flow, in order to maintain its rate, consequently fills the space also further down. Because the flow cannot get out directly at the end of the first part of the convection section, it turns, from underneath the wall according to the present invention, to the outlet part, and flows then along the bottom part of this half first back towards the furnace, but has no access back to the inlet opening, because the wall of the invention prevents it. Instead of this, because the outlet part in turn gradually expands towards its end (towards the convection section), the flow rises and turns to flow, again in a plug-like formation, towards the inlet of the convection section. This ensures that the cold flow does not return to the outlet opening of the furnace uptake shaft. At the same time, the delay time favourable for heat transfer is lengthened.

Apart from sulfur dioxide, the dusts flowing to a waste heat boiler from a suspension smelting furnace often contain oxides or sulfides of the metal to be smelted, such as copper or nickel. Particularly sulfides easily form dust accretions in the boiler, where they stick onto the cooled surfaces and form sulfates while oxidizing there. It has been proved that if dust-containing gases are mildly oxidized while the gas temperature is over 600° C., the metal compounds of the dusts react forming sulfates, but in the temperature range 450°–600° C., the primary reaction is the oxidizing of sulfur dioxide to sulfur trioxide, which should be avoided in order to prevent the formation of sulfuric acid. It is favourable for the process that the dusts react to sulfates, in case the sulfatizing can be carried out so that the sulfates do not form dust accretions. By employing the method of the present invention, the formation of dust accretions is prevented so that the gases are kept in a uniform bulk flow without small, separate eddy flows. The whole bulk flow is oxidized, and thus the oxidizing takes place in a uniform fashion, at a high temperature, so that the sticking of the dusts to the surfaces is prevented.

The present invention relates to a waste heat boiler construction successive to a smelting furnace, such as a suspension smelting furnace, wherein the total space of the waste heat boiler is advantageously made use of, and simultaneously the direct flowing of the dust-bearing gases radiation section of the waste heat boiler to the convection section thereof is prevented in order to reduce the tendency to dust accretions caused by these gases.

BRIEF DESCRIPTION OF THE DRAWINGS

The invention is explained in more detail below, with reference to the appended drawings where.

DETAILED DESCRIPTION OF PREFERRED EMBODIMENTS

Figure 1:
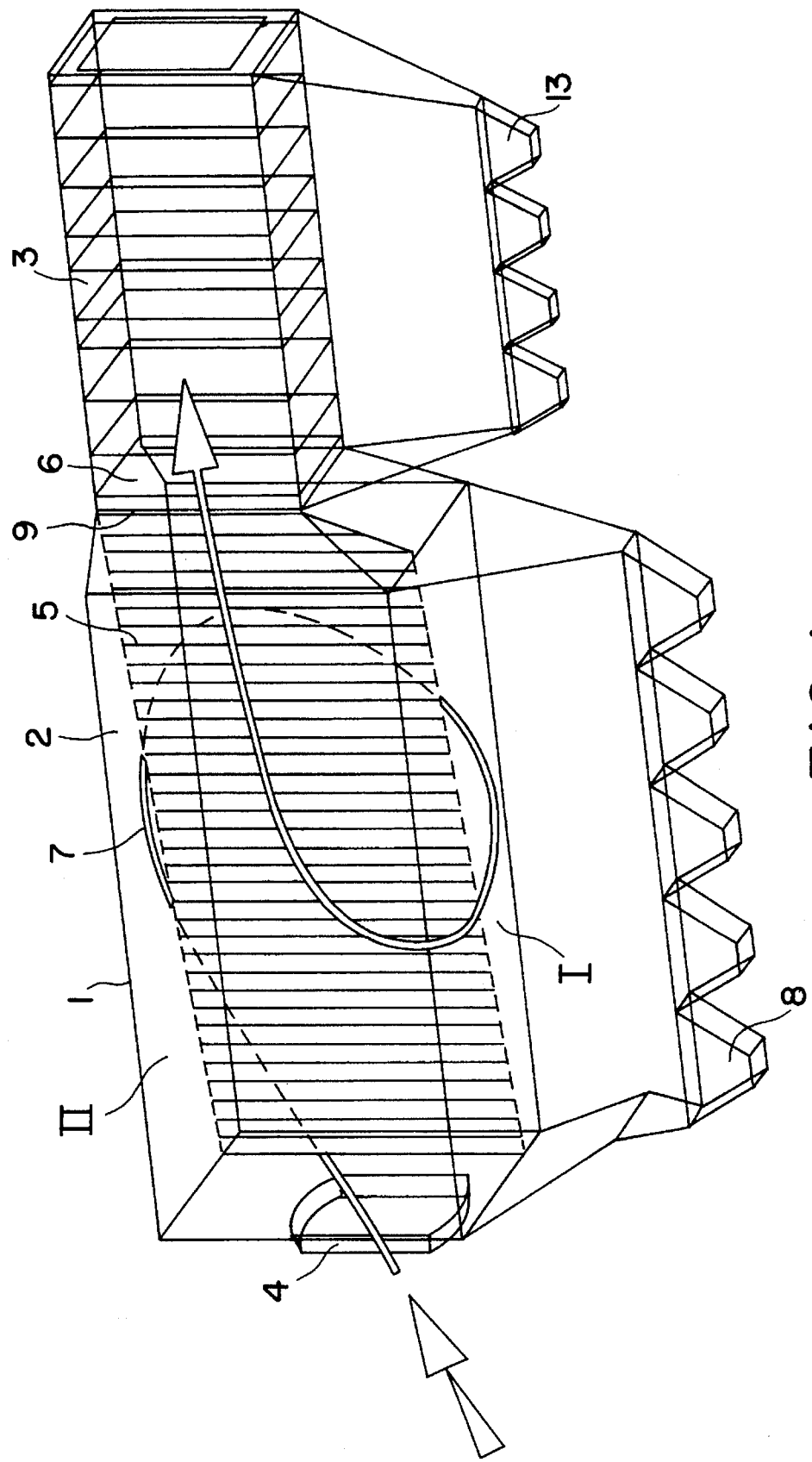
FIG. 1 illustrates a preferred embodiment of the waste heat boiler construction of the invention, seen in a three-dimensional side view elevation.

As is seen in FIG. 1, the waste heat boiler 1 comprises a radiation section 2 and a convection section 3. Gas coming from a suspension smelting furnace (not illustrated in the drawing) is conducted, via the inlet opening 4, first to the radiation section of the boiler, which is provided with an intermediate wall 5 according to the invention, formed of steam pipes. It is likewise apparent from the drawing that at least part of this intermediate wall is bent diagonally, so that the gas inlet 4 remains totally in the first or inlet part I divided by the intermediate wall 5, and that the gas outlet 6 into the convection section of the boiler is located in the second or discharge part II of the radiation section. The intermediate wall essentially extends over the whole length of the radiation section. The arrow 7 in the drawing depicts the direction of the gas circulation in the radiation section. It is seen that the gas flow first circulates in the inlet part I and thereafter turns downwardly into the discharge part II, wherefrom it flows to the convection section 3. It is essential that the gas circulates as a bulk-like flow, so that there are not formed separate eddy currents, which are the problem in most boiler constructions.

Owing to the new intermediate wall 5, the gas flow must make effective use of the space of the whole radiation section. When the gas also must circulate the lower parts of the radiation section, this helps the dusts to be collected in funnel-like dust chutes 8 provided underneath the radiation section. In the vertical direction, the intermediate wall 5 is suspended from the ceiling of the radiation section, essentially vertically downwards, so that it advantageously extends lower down than the outlet 6 leading to the convection section. By using the embodiment illustrated in the drawing, the gas flow is prevented from returning to the outlet 4 from the suspension smelting furnace, and the formation of dust accretions in this aperture is essentially reduced. If oxygen is fed into the gas flow, this is done in the first part I with respect to the flowing direction, when the gas temperature is sufficiently high in order to provide favourable conditions for an advantageous sulfatizing reaction.

Figure 2:
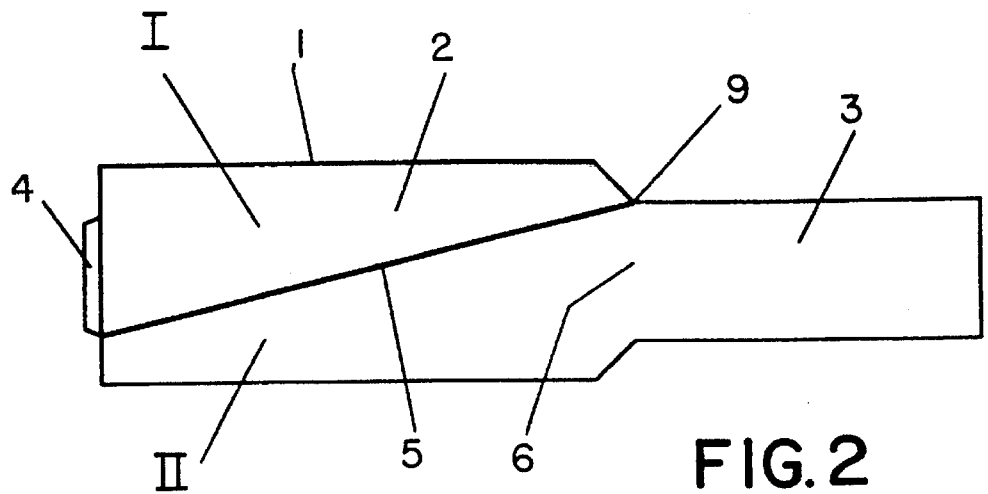
FIG. 2 illustrates an embodiment of FIG. 1, provided with a uniform intermediate wall, seen from the top.

As is seen in FIG. 2, an advantageous form for the intermediate wall 5 is, that it extends as a uniform construction over the whole length of the radiation section of the waste heat boiler. The intermediate wall begins at the front wall of the radiation section, on the other side of the gas inlet 4, continues diagonally across the radiation section, and ends in the wall 9 at the beginning of the convection section.

Figure 3:
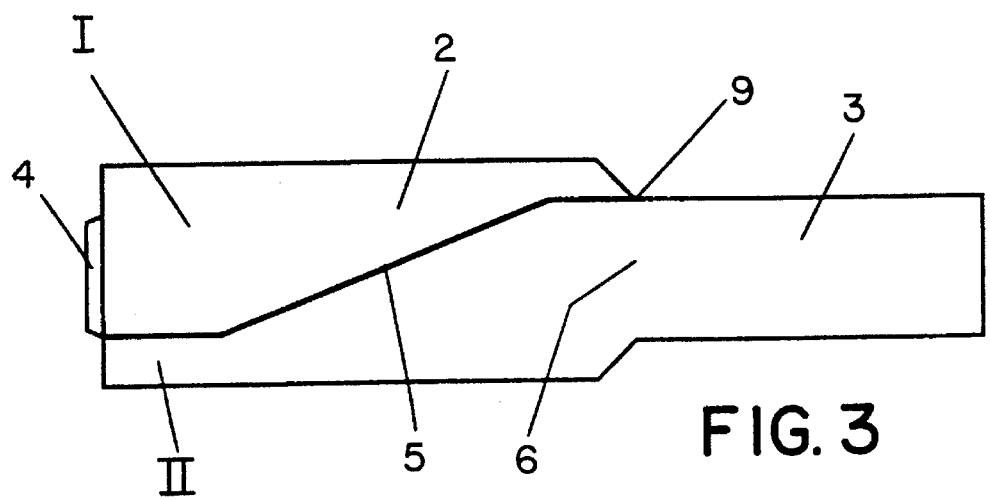
FIG. 3 illustrates another embodiment of the construction of FIG. 1, seen from the top, FIGS. 4 and 5 likewise illustrate applications of the embodiment of FIG. 1, seen from the top.

FIG. 3 shows another embodiment of the intermediate wall 5, where the wall is a uniform construction, but provided with angles, so that at its beginning and end, it is parallel to the lengthwise direction of the radiation section, but in the middle diagonally directed towards the convection section.

Figure 4:
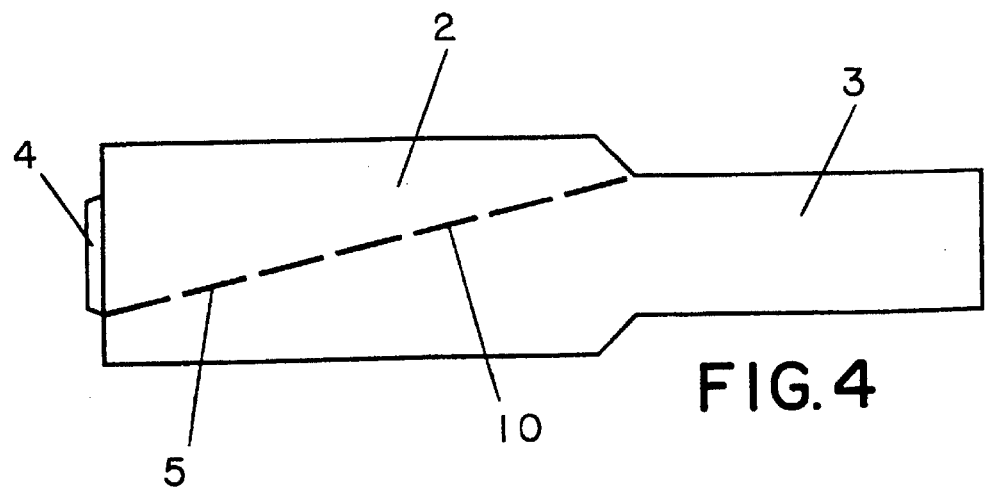
Figure 5:
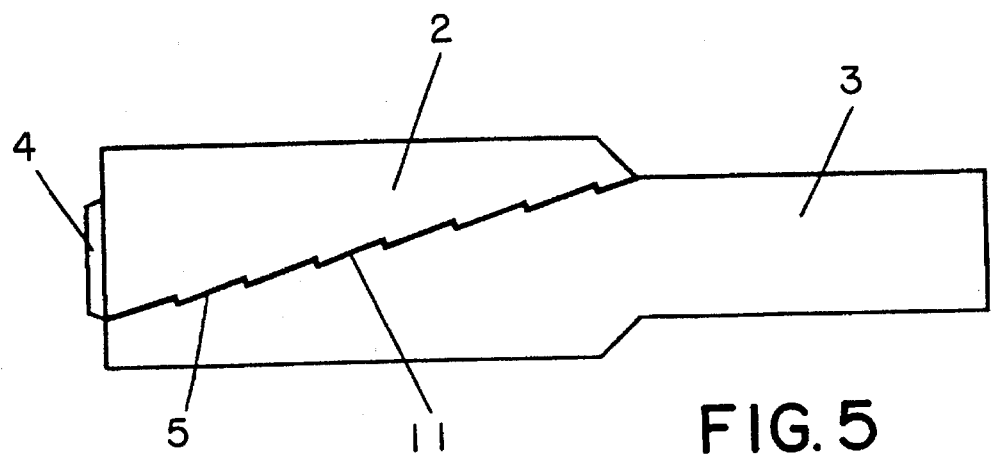

In the embodiment of FIG. 4, the intermediate wall 5 is formed of several separate pipe panels 10. In the embodiment of FIG. 5, the intermediate wall is likewise formed of several pipe panels 11, which are interconnected in a scale-like fashion. Owing to for instance thermal motion of the boiler, it is sometimes advantageous to construct the intermediate wall of several elements. The apertures in between these elements are so small that the gas flows proceeding on different sides of the wall are not mixed.

Figure 6:
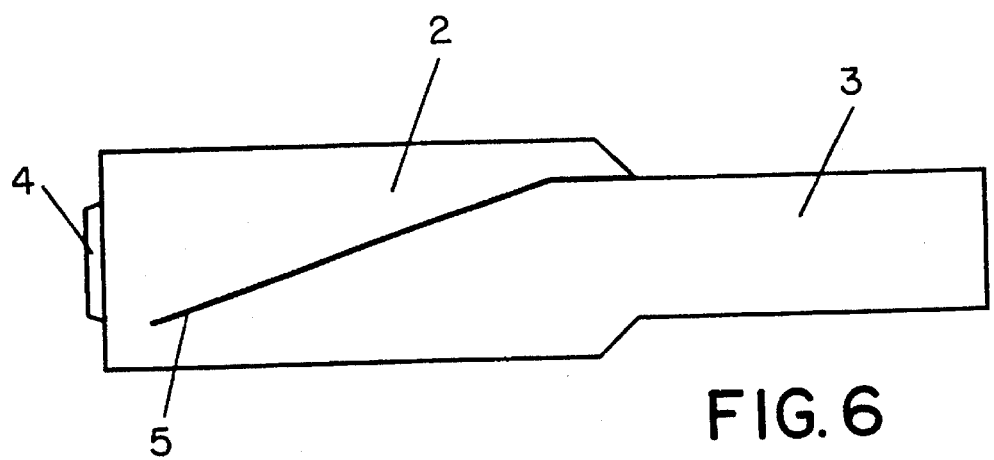
FIG. 6 illustrates another application of the embodiment of FIG. 3, seen from the top.

The embodiment of FIG. 6 is otherwise similar to that of FIG. 3, but in this case the first part parallel to the radiation section is totally left out, and at the beginning the gases can flow freely. The essential point is that the impulse of the gas flow is so high that the gas does not flow through the aperture left there, but continues circulation in essentially the same direction as in a closed construction. The aperture can be left there for instance for reasons of construction.

Figure 7:
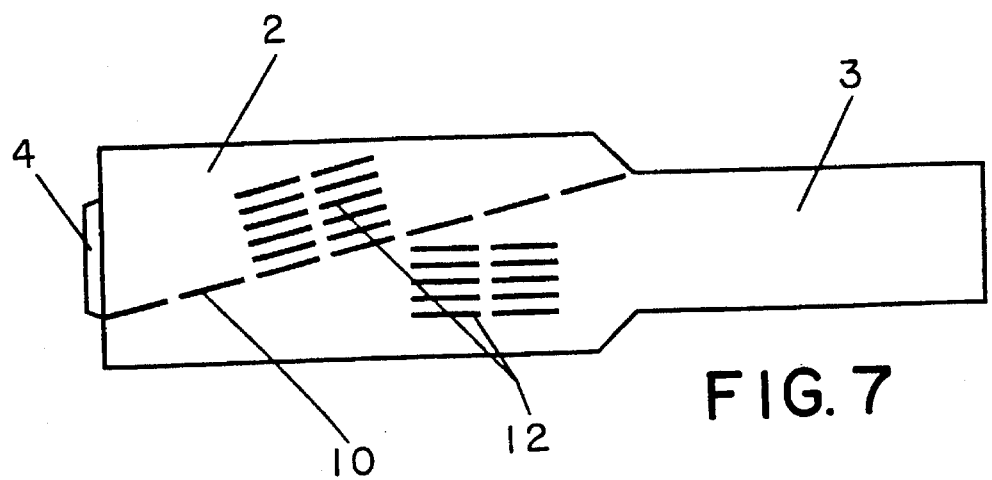
FIG. 7 illustrates an application of the embodiment of FIG. 4, seen from the top.

FIG. 7 shows an embodiment which is of the same type as the one illustrated in FIG. 4, but in this case the radiation section of the boiler is provided, in addition to the intermediate wall 10 formed of pipe panels, with additional pipe panels 12 on both sides of the intermediate wall. The additional panels can be arranged in several rows. The idea is to make use of already existing structures, for instance.

The final heat recovery takes place in the convection section of the waste heat boiler, where the gases enter after the majority of solid impurities is removed, and the dusts can be recovered from the funnel-like chutes provided in the radiation section after being dropped there. Finally the solids stuck to the panels also fall on the bottom, because the panels of the intermediate wall are provided with conventional rapping devices (not illustrated), which from time to time drop the accumulated material. The bottom of the convection section is likewise provided with funnel-like members 13 in order to recover and discharge the solids separated from the gas. In the convection section, the heat is recovered in the vapor/liquid circulating in the cooling pipework.

The gases exhausted from the waste heat boiler already are fairly pure, and now they can be conducted to an electrofilter for final cleaning, before the dusts are conducted to further processing.

The above described waste heat boiler construction is easily applied to existing boilers, and the efficiency of the boiler can be essentially increased by means of the new intermediate wall.

We claim:

1. A method for recovering heat and reducing dust accretions from smelting furnace exhaust gases flowing through a horizontal waste heat boiler having a radiation section and a convection section, wherein the exhaust gases flow from a radiation section inlet and through the radiation section to a convection section inlet horizontally spaced from the radiation section inlet along a flow path through the radiation section, by lengthening the flow path through the radiation section and thereby increasing the time that the exhaust gases spend in the radiation section for increasing heat recovery from the exhaust gases, comprising: (a) causing the exhaust gases to flow from the radiation section inlet toward the convection section inlet, then (b) directing the flow of exhaust gases downward and back toward the radiation section inlet, and then (c) directing the gases to again flow toward the convection section inlet.

2. The method of claim 1 including feeding an oxidizing agent into the flow of exhaust gases in step (a).

3. The method of claim 1 including recovery of dust from the exhaust gases in the radiation section.

4. The method of claim 1, including lengthening the flow path through the radiation section by interposing a wall in the radiation section to prevent the exhaust gases from flowing directly from the radiation section inlet to the convection section inlet.

5. In a horizontal waste heat boiler for recovering heat and dust from smelting furnace exhaust gases, having a radiation section and a convection section, an elongated wall constructed of steam pipes suspended from and extending downwardly from a ceiling of the radiation section and extending lengthwise and diagonally along the radiation section, said wall dividing the radiation section into an inlet part and an outlet part for lengthening the flow path of exhaust gases through the radiation section to the convection section to improve the recovery of heat and dust from the exhaust gases.

6. Apparatus according to claim 5 wherein the inlet part has an inlet for smelting furnace exhaust gases.

7. Apparatus according to claim 5 wherein the outlet part has an outlet to the convection section.

8. Apparatus according to claim 7 wherein the wall extends downwardly below the outlet to the convection section.

9. Apparatus according to claim 5 wherein the wall is continuous.

10. Apparatus according to any one of claims 5–8 wherein the wall comprises several pipe panels.

11. Apparatus according to claim 10 wherein apertures are defined between the pipe panels, which apertures are too small to allow mixing of exhaust gases flowing on opposite sides of the wall.

12. Apparatus according to any one of claims 5–9 wherein the wall extends along the entire length of the radiation section.

13. Apparatus according to any one of claims 5–9 wherein additional pipes are arranged in panels parallel to said wall.

* * * * *